Patented June 10, 1947

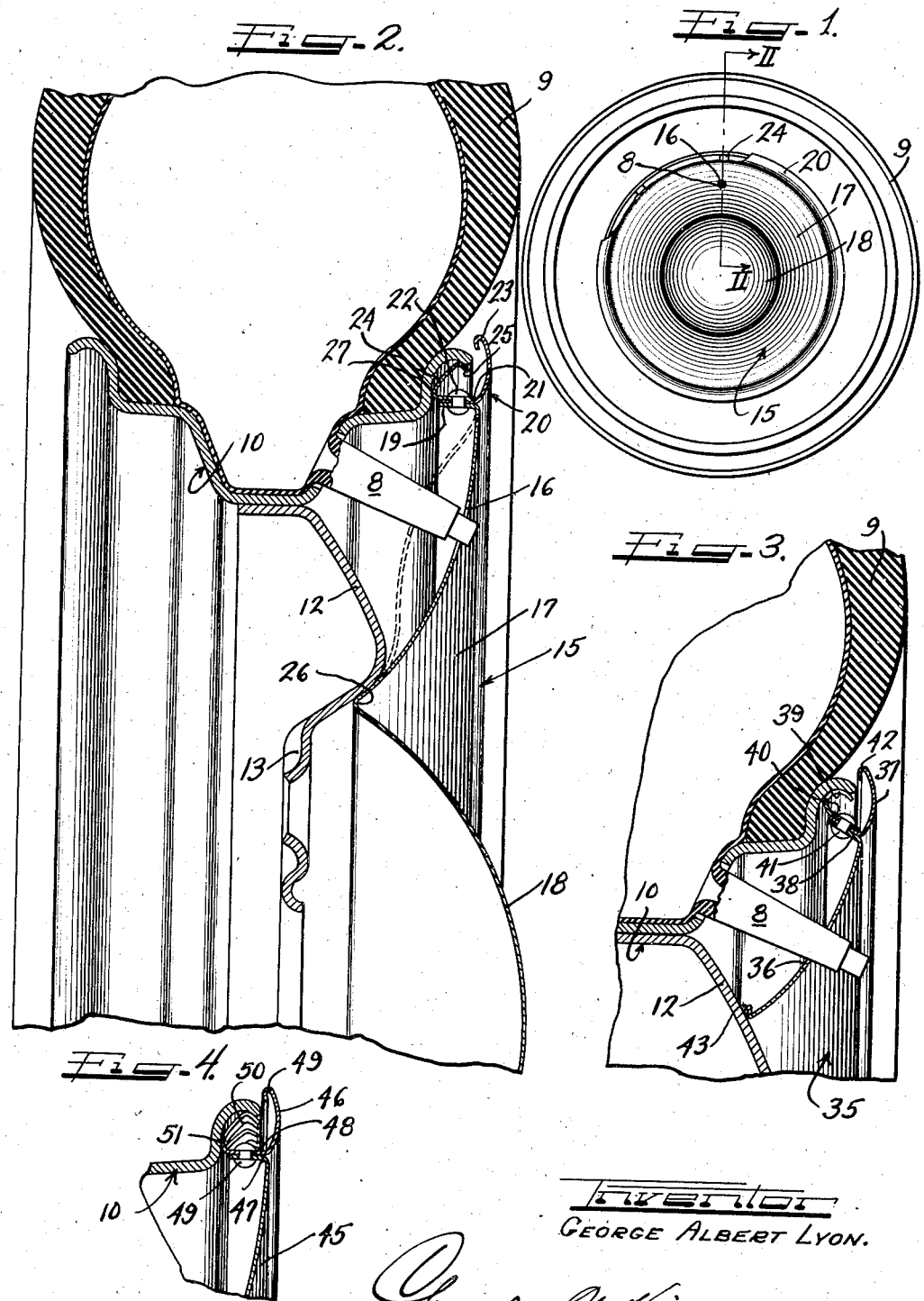

2,421,756

UNITED STATES PATENT OFFICE 2,421,756

VEHICLE WHEEL COVER

George Albert Lyon, Allenhurst, N. J.

Application November 1, 1943, Serial No. 508,467

7 Claims. (Cl. 301—37)

This invention relates to a wheel structure and more particularly to a novel reinforced plastic cover for use on automotive vehicles.

An object of this invention is to provide an improved and simplified form of cover preferably made of a synthetic plastic and which is properly reinforced at its point of bearing and attachment to the wheel.

Another object of this invention is to provide an improved way of detachably holding a plastic cover on a wheel and wherein the holding or fastening means is sufficiently rigid as to not be permanently deformed in use.

A still further object of this invention is to provide a novel and simplified form of reinforced plastic cover wherein the cover is of such cross-sectional contour as to have the proper support on the wheel as well as to give the wheel a highly desirable ornamental appearance.

Another and further object of this invention is to provide a wheel structure wherein cover means cooperate in a novel and advantageous manner with the wheel at its points of attachment and bearing on the wheel.

In accordance with the general features of this invention, there is provided an article of manufacture in the form of a circular wheel cover of plastic material having an outer margin turned axially rearward into the form of an annular skirt to which is attached the annular skirt of a reinforcing outer annular metallic bead, the two skirts being fastened together in such a manner as to provide a double thickness of material adjacent the point of the application of the retaining and pry-off forces to the wheel cover.

Another feature of the invention relates to the provision of a wheel cover of the aforementioned characteristics which is inturned at its central portion for bearing against the body of the wheel and which has its outer portion provided with an ornamental bead so arranged that the retaining means thereof is adapted to be backed up by a flange of the tire rim member of the wheel.

A further feature of this invention relates to the provision of a circular plastic wheel cover having an outer annular portion of such a contour as to appear to be a continuation of the side wall of the tire and which annular portion is rigidified at its peripheral margin by means which is also utilized as the detachable retaining means for the cover.

In accordance with still other features of this invention are provided several different forms of retaining means on the outer annular bead of the cover, which retaining means in all forms comprises a plurality of retaining fingers of a configuration to permit of an easy-on, hard-off application of the cover to the outer flange of the tire rim of the wheel.

Other objects and features of this invention will more fully appear from the following detailed description taken in connection with the accompanying drawings which illustrate several embodiments thereof and in which Figure 1 is a side elevational view of a wheel structure embodying the features of this invention, partly broken away to show the cover retaining fingers;

Figure 2 is an enlarged fragmentary cross-sectional view taken on the line II—II of Figure 1 looking in the direction indicated by the arrows and showing in dotted lines the manner in which the outer annular portion of the plastic wheel cover may be flexed inwardly to permit of access to the valve stem of the wheel;

Figure 3 is a fragmentary cross-sectional view corresponding to the upper right-hand portion of Figure 2, but illustrating a modified form of retaining means as well as illustrating a slightly modified form of wheel cover; and Figure 4 is a fragmentary cross-sectional view illustrating still another form of retaining finger on the outer metallic bead of the plastic cover.

As shown on the drawings:

The reference character 9 designates generally a conventional type of automotive tire provided with the usual inner tube which has the usual valve stem 8 extending through one of the flanges of the tire rim 10. The tire rim 10, as is well-known in the art, is of a multiflanged construction and is commonly termed a drop-center type of tire rim. This tire rim 10, as is also well-known in the art, is supported upon a central load bearing member or wheel body 12 which comprises a metallic stamping and has a dished central portion 13.

The dished central portion 13 of the wheel body is flanged in the customary manner and is apertured to accommodate bolts or cap screws (not shown) such as are commonly used in the automotive field for attaching a wheel to an axle or other supporting member on a vehicle.

Associated with this conventional wheel structure is a wheel cover designated generally by the reference character 15 and which embodies the features of this invention. The wheel cover proper comprises two integral plastic sections 17 and 18, the outermost of which is in the form of an annulus and the innermost of which is in the form of a dome and may be termed the hub cap part of the cover. These two portions 17 and 18 have adjoining inturned portions so that they terminate in an intermediate annular section 26 which is adapted to telescope the stamped wheel body 12 and to bear against the wheel body 12 inside of the central recessed portion thereof. Thus the wheel body is utilized to back up the central portion of the wheel cover.

Attention is also directed to the fact that the intermediate portion of the annulus 17 is apertured at 16 so that the valve stem 8 may project therethrough. Due to the fact that the wheel cover is made of a synthetic plastic material, it is of course evident that the cover may be depressed to the dotted line position shown in Figure 2 for the purpose of affording access to the valve stem when it is desired to introduce air therein.

At this point it should be noted that the wheel cover 15 may be made of any suitable synthetic plastic material having the requisite properties to make it form retaining, and yet being sufficiently resilient to be resistant to permanent deformation. In other words the cover should be capable of being slightly dented and yet have the ability to spring back to its original position after indentation or deflection of the same. Excellent results may be obtained by making this cover out of a synthetic plastic material such, for example, as ethyl cellulose.

The outermost portion of the annulus 17 of the cover is turned axially rearwardly into an annular skirt 19 which is disposed opposite an outermost flange of the tire rim 10. Now, I propose in accordance with the features of this invention to utilize that skirt as a means for supporting retaining means for the cover as well as for supporting an ornamental outer bead on the cover. The outer annular metal bead is designated generally by the reference character 20 and embraces a hollow section terminating at its outer periphery in a turned edge 23 disposed beyond the tire rim and in close proximity to the outer side wall of the tire 9.

The section or hollow bead 20 has its inner peripheral portion formed into a rearwardly extending annular skirt 21 adapted to be telescoped by the skirt 19 so that the two skirts may be fastened together by rivets or other means 22 for the purpose of making them integral, thus providing a double thickness of material at the outer margin of the cover. The inner extremity of the bead skirt 21 is formed into a plurality of axially outwardly inclined retaining fingers 24. These fingers are spaced equidistantly apart about the periphery of the cover as shown in Figure 1. Each of the fingers also includes an outer angular or bent extremity 25 adapted to be resiliently pressed in and behind the outermost extremity of the outermost flange of the tire rim 10. It should also be noted that the fingers 24 are so arranged that they are adapted to bear at 27 against the flange of the rim so as to be backed up by that flange when they are pressed home into the retaining position shown in Figure 2. In this form of the invention, I do not propose to use a continuous series of fingers but rather to use a half a dozen or so fingers equidistantly spaced apart.

The outer extremities 25 of these fingers are normally arranged in a circle of a diameter slightly in excess of that of the inner surface of the rim flange to be engaged so that when they are pressed home into retaining position they are actually under resilient stress to retain the cover on the wheel.

The angle of inclination of the fingers, however, is such as not to preclude the removal of the cover by means of a pry-off tool. Such removal may be effected by inserting the edge of a blunt instrument under the turned edge 23 of the metallic bead 20 and upon the application of a twisting movement the cover may be forcibly pried free of the wheel. During this act of prying the cover free of the wheel, the fingers 24 are progressively and resiliently disengaged from the cooperating portion of the flange of the rim. Furthermore, it will be perceived that the pry-off force is applied to the cover at a place where the cover is rigidified and also at a place where the cover has a double thickness of material, which double thickness of material is backed up by an engagement on the flange of the rim through the fingers.

The inclination and shape of the fingers is such as to permit of an easy-on action and a hard-off action. In other words, the cover goes on easily by pressing it axially into position on the wheel, but is somewhat more difficult to remove in that it is necessary to apply a pry-off force to the outer edge 23 of the cover.

The ornamental bead 20 may be made of any suitable material, but I preferably contemplate that it be made of stainless steel so as to enable the bead to have a high lustrous external finish at or adjacent the junction of the cover with the tire. The bead 20 in reality fills the gap between the outer portion of the plastic cover 15 and the side wall of the tire so that the cover appears to be a continuation of the side wall of the tire. This results in the tire appearing to extend clear down to the hub cap portion 18, or, in other words, to the indented section 26 of the cover. The result may be further augmented by giving the annular portion 17 of the cover an external white finish. When this portion 17 has a white appearance, it appears to be a white sidewall of the tire.

Furthermore, it will be perceived that this result that I am desirous of obtaining is further enabled by reason of the fact that the outer peripheral portion of the cover 15 is axially outwardly further than the inner peripheral portion of the section 17 which terminates at 26 within the confines of the wheel body 12.

Thus the outer annular metallic bead 20 of the wheel cover not only conceals the outermost flange of the wheel rim, but in addition conceals the retaining means and extends the periphery of the wheel cover beyond the wheel rim and to a position adjacent the side wall of the tire.

The advantageous features and functions noted above are substantially present in the two modifications of the invention shown in Figures 3 and 4. These modifications of the invention operate in substantially the same manner, and hence I will not repeat the foregoing advantages and operational characteristics in connection with these figures. The principal differences between these modifications of the invention and the form shown in Figure 2 reside in the character of the retaining means formed on the bead.

In Figure 3 I have employed the same reference numerals to designate parts of the wheel common to both Figures 2 and 3 inasmuch as the same wheel and tire is used in both of these illustrations.

I have designated the wheel cover generally by the reference character 35. Unlike the wheel cover 15, it is in the form of an annulus rather than a complete disk so that it does not extend radially inwardly over the center of the wheel spider or body. The inner peripheral margin of the cover 35 is slightly turned at 43 so as to form a reinforced bearing edge adapted to bear on the outer surface of the wheel spider 12.

The intermediate portion of the annular cover 35 is provided with an aperture 36 through which the valve stem 8 extends so as to be accessible. By reason of the fact that the cover 35 does not bulge radially outwardly as far as the cover portion 17 of the first form of the invention, the valve stem can normally extend a sufficient distance beyond the wheel cover so as to be accessible without requiring deflection of the wheel cover 35 as is required in the case of the form of the invention shown in Figure 2.

It should be noted that the cover 35 may be made of the same type of plastic material as is used in the case of the cover 15. The outer peripheral portion of the plastic cover 35 is formed into a rearwardly extending skirt 38 which may be slightly inclined as shown in Figure 3. Attached to this skirt is a metallic annular bead 37 having an outer turned edge 42 lying beyond the outermost edge of the wheel rim 10. This metallic bead 37 has a skirt 40 which is attached by rivets or the like 41 to the skirt 38. The innermost edge of this skirt 40 is provided with loop-like fingers 39 which are adapted to be resiliently cammed into retaining engagement with the curved outer edge of the wheel rim 10. Unlike the fingers 24 of the first form of the invention, each of these fingers has a curvature such as to cause it to nest inside of the curved outer extremity of the wheel rim flange. However, by reason of the fact that the outermost edge of the wheel flange is undercut, it is clear that when these fingers are pressed into stressed retaining engagement with the wheel rim, they will exert a sufficient retaining force to hold the cover in position on the wheel. The removal and application of this cover 35 to the wheel is substantially the same as in the case of the preferred form, and hence such operations will not be redescribed.

In Figure 4, I have illustrated a still further form of the invention wherein the plastic wheel cover 45 has an outer annular skirt 47 attached to a skirt 48 of an outer metallic bead 46. The outer edge of this bead is turned at 49, as is true of the other forms of the invention. The innermost portion of the metallic skirt 48 is formed into a plurality of inclined fingers 50 which are similar to the fingers 24 of the first form of the invention. These fingers are adapted to bear at 51 against the flange of the rim so as to be backed up by the flange. The outermost extremity of each of these fingers is inclined for retaining engagement with the outermost edge of the tire rim in much the same manner as in the case of the form shown in Figure 2. The principal difference between these two forms of the invention resides in the fact that in Figure 4 the retaining fingers are more or less a continuous series of fingers, whereas in Figure 1 the fingers are spaced at relatively great distances apart.

The operation of this form of the cover is the same as the other forms, and for that reason no further description is deemed necessary.

I claim as my invention:

1. In a wheel structure including a multiflange rim and a body for supporting the rim, a wheel cover of plastic material having an outer margin turned axially rearwardly into the form of an annular skirt disposed adjacent an outermost flange of the rim, and a reinforcing outer annular metallic bead located over the outermost flange of the rim and extending therebeyond so as to be adjacent the tire carried by the rim, said bead having an inner margin formed into a skirt telescoped by the skirt on the cover and suitably anchored thereto, the double thickness of material established by the two skirts also providing a base for retaining fingers formed on the bead and affording resilient slidably engaging shoulders arranged for snap-on pry-off engagement with the outermost flange of the tire rim.

2. In a wheel structure including a multiflanged tire rim part and a central body part, said rim part having an axially extending edge portion curved radially inwardly to provide a groove, a circular wheel cover of plastic material having an outer margin turned axially rearward into the form of an annular skirt and a reinforcing outer metallic bead having an inner margin formed into a skirt fastened to the skirt of said cover to provide a double thickness of material at the periphery of the cover, said skirt of the bead also having formed on it a plurality of fingers extending axially inwardly, each turned back upon itself and affording a snap-on and pry-off shoulder loop so as to have stressed, resilient retaining engagement in said groove upon axially inward movement of said cover relative to the wheel and concentrically therewith, said fingers being formed to be backed up by contact of an axially inward portion thereof with a part of the wheel as they are stressed into retaining engagement with the wheel.

3. As an article of manufacture, a circular wheel cover of plastic material having an outer axially rearwardly turned marginal flange structure, a reinforcing outer metallic bead protectively encircling said margin and fastened to the flange structure, and cover-attaching means extending from the junction of the cover and bead for attachment of the cover to a wheel structure.

4. The article of claim 3 wherein the cover-attaching means comprise a plurality of individual clip members secured to said marginal flange structure together with said bead.

5. The article of claim 3 wherein the cover-attaching means comprise a plurality of spring finger loops formed integrally with and comprising part of the bead.

6. As an article of manufacture, a circular wheel cover of plastic material having an outer margin turned axially rearwardly and providing an annular skirt, a reinforcing outer metallic bead protectively encircling said outer cover margin and having an inner margin formed into a skirt fastened to the radially outer face of said cover skirt, and means for attaching the cover to a wheel structure extending axially inwardly from the juncture of the cover and bead skirts, the plural ply of material afforded by the joined skirts rigidifying the outer margin of the cover against stresses imposed upon the cover assembly through said retaining means.

7. As an article of manufacture, a cover of plastic material formed to afford a general simulation of a white sidewall for a tire when applied to a tire equipped vehicle wheel and having a radially outer marginal flange turned axially inwardly to lie adjacent to but radially inwardly of the outer flange extremity of a tire rim, a protective metallic bead formed to overlie and conceal the tire rim extremity and engaging said flange at its radially outer face, fastening elements securing said bead to said flange, and means extending from said bead for attachment of the cover assembly to the wheel structure.

GEORGE ALBERT LYON.

REFERENCES CITED

The following references are of record in the file of this patent:

UNITED STATES PATENTS

| Number | Name | Date |
|---|---|---|
| 2,135,757 | Lyon | Nov. 8, 1938 |
| 1,234,387 | Pugh | July 24, 1917 |
| 2,279,334 | Lyon | Apr. 14, 1942 |